United States Patent
Rieke et al.

(10) Patent No.: US 7,338,236 B2
(45) Date of Patent: Mar. 4, 2008

(54) CUTTING TOOL

(75) Inventors: Friedrich-Wilhelm Rieke, Kalletal-Bavenhausen (DE); Thomas Neudeck, Lemgo (DE); Andreas Koester, Lemgo (DE)

(73) Assignee: Gebr. Brasseler GmbH & Co. KG, Lemgo (DE)

( * ) Notice: Subject to any disclaimer, the term of this patent is extended or adjusted under 35 U.S.C. 154(b) by 229 days.

(21) Appl. No.: 10/470,908

(22) PCT Filed: Jan. 30, 2002

(86) PCT No.: PCT/EP02/00971

§ 371 (c)(1),
(2), (4) Date: Sep. 1, 2005

(87) PCT Pub. No.: WO02/060629

PCT Pub. Date: Aug. 8, 2002

(65) Prior Publication Data

US 2006/0056927 A1    Mar. 16, 2006

(30) Foreign Application Priority Data

Feb. 1, 2001   (DE) ................................ 101 04 580

(51) Int. Cl.
*B23C 5/10*    (2006.01)

(52) U.S. Cl. .......................................... 407/54; 407/53
(58) Field of Classification Search ................. 407/53, 407/54, 63, 64, 65, 59
See application file for complete search history.

(56) References Cited

U.S. PATENT DOCUMENTS

| | | | | |
|---|---|---|---|---|
| 4,145,159 | A * | 3/1979 | Yamada et al. ................ | 407/53 |
| 4,795,289 | A * | 1/1989 | Potemkin ...................... | 408/80 |
| 4,847,464 | A * | 7/1989 | Moore, Sr. ................ | 219/69.15 |
| 5,213,452 | A * | 5/1993 | Kirby ........................... | 407/42 |
| 6,168,355 | B1 * | 1/2001 | Wardell ....................... | 407/54 |
| 6,435,780 | B1 * | 8/2002 | Flynn .......................... | 407/53 |

FOREIGN PATENT DOCUMENTS

| | | |
|---|---|---|
| DE | 154 242 | 12/1903 |
| DE | 313 494 | 2/1918 |
| FR | 2 531 887 | 2/1984 |
| FR | 2 749 203 | 5/1997 |

* cited by examiner

*Primary Examiner*—Willmon Fridie, Jr.
(74) *Attorney, Agent, or Firm*—Pearne & Gordon LLP

(57) ABSTRACT

A milling tool 1, in particular a tubular drill, includes a shaft 2 and a working portion 3. At least one cutting edge 8 is provided at a face of the working portion 3 and at least one bore 4 extends into the face of the working portion 3. The axis of the bore 4 extends axially parallel or in an angle, preferably between 0° and 20°, with respect to an axis 5 of the tool 1.

20 Claims, 2 Drawing Sheets

CUTTING TOOL

CROSS-REFERENCE TO RELATED APPLICATIONS

This application was published in German on Aug. 8, 2002 as International Publication Number WO 02/060629 A1.

FIELD OF THE INVENTION

The invention relates to a milling tool and in particular to a so-called tubular drill, as it is used by jewellers or goldsmiths for producing pieces of jewellery.

BACKGROUND OF THE INVENTION

Milling tools and tubular drills of that kind are known. They serve to round off the ends of wires with which jewels are held in their frames. For these purposes, milling tools with precision gear cuttings have been developed as shown in FIG. 8 in a lateral view and in FIG. 9 in a front view. The milling tool 101 shown therein comprises a shaft 102 and a working portion 103. The working portion 103 is provided with a plurality of radially extending cutting edges 108, which converge in the center. Due to this circumstance, reduced cutting spaces are provided that do not guarantee good chip removal. Therefore, the known milling tools or tubular drills, respectively, tend to clog and get loaded.

BRIEF SUMMARY OF THE INVENTION

It is therefore an object of the present invention to provide a milling tool and in particular a tubular drill which is capable of performing the rounding off procedure in a simple and fast manner without the danger of clogging the cutting edges.

This object is solved by the features of claim 1.

Due to this embodiment, a milling tool or a tubular drill, respectively, is provided with which chip removal is guaranteed, as a sufficiently large area for the chip removal can be provided by means of slits. Thus, the rounding off process is made easier and the milling tool prevents clogging and loading of the cutting edges that enhances the cutting performance of the tool.

Preferred embodiments are described in the subclaims.

According to a preferred further development, the bore is disposed eccentrically, such that the axis of the bore extends laterally offset with respect to the axis of the tool. By way of this embodiment, a cutting angle is generated at the resulting cutting edge, which positively influences the cutting performance of the tool.

The chip removal can further be influenced in a positive sense if according to the preferred embodiment, at least one slit is provided, the following edge of which forms the cutting edge. In this way, an edge is generated which offers at its front side sufficient space for a good chip removal through the slit and has at its rear side a sufficient clearance angle for a good penetration of the edge into the material to be processed.

Preferably, the slit extends from the axis of the tool to the outer circumferential surface of the working portion and the following side surface of the slit extends substantially through the axis of the tool. Thus, the chips can be discharged outwardly. This prevents clogging at the edges.

According to a preferred embodiment, at least two bores are provided, the axes of which extend parallel to each other or in an angle, preferably between 0° to 20°, with respect to the axis of the tool. The axes of the two bores are also arranged such that they are laterally offset with respect to the axis of the tool by the same amount or by different amounts, but in different directions, such that the contour of the bores viewed from the front forms a circle being slightly centrically constricted. This arrangement presents an optimum relation between the number of edges and the available cutting space.

In order to guarantee an optimum chip removal in this embodiment, preferably two slits are provided. The slits are arranged such that respectively one slit—relative to the rotational direction—is positioned directly in front of the contraction. Thus, chips generated by the respective edges can be discharged directly through the slits to effectively prevent clogging.

According to alternative embodiments, it is also possible to provide more than two cutting edges. If this is the case, in accordance with a preferred embodiment, the number of eccentric bores corresponds to the number of cutting edges or the number of slits, respectively. With this arrangement, the chips produced by each edge can be directly discharged from the cutting position, without the occurrence of clogging.

In case of several edges or bores, it is advantageous for reasons of manufacturing if the bores, the slits and the cutting edges are arranged such that there results a symmetric assembly.

The chip removal can be further ameliorated if according to a preferred embodiment, each slit has a smooth, in particular arc-shaped groove bottom. Such a shape positively influences the transport of the chips, thereby preventing collection of chips and clogging of the slits.

By way of the shape of the bore, the shape generated at the working portion can be influenced. Therefore, each bore has, according to a preferred embodiment, when viewed from the side, the shape of a semicircle, such that a semicircular shaped end at the working portion is generated.

However, if a different end form is desired, another shape of the bore can also be provided. For example, each bore, viewed from the side, can have the shape of a cone, such that a cone-shaped end is generated at the working portion.

Concerning the displacement of the bore and concerning the width of the slits, experiments may be made to a broad extent. However, it has proven to be especially appropriate if the displacement of each eccentric bore ranges from 0 to a maximum of about 0.25 of the diameter of the working portion and if the width of the slits ranges from 0 to a maximum of about 0.5 of the diameter of the working portion. Thus, the size of the cutting spaces and the size of the chip discharge can be coordinated optimally.

BRIEF DESCRIPTION OF THE DRAWINGS

Further advantages, features and developments of the present invention result from the description of preferred embodiments. In the drawings.

DESCRIPTION OF EXAMPLE EMBODIMENTS

Figure 1:
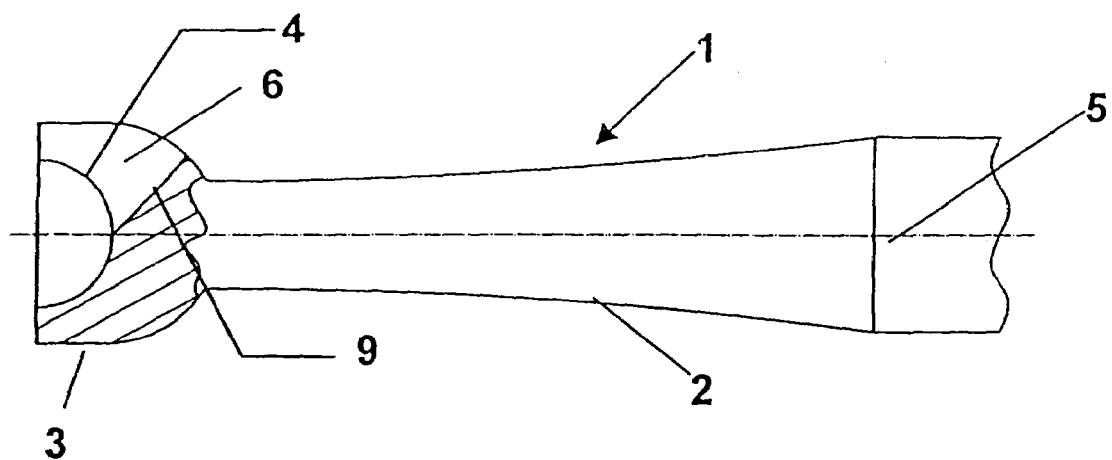
FIG. 1 is a side view of the inventive milling tool.
Figure 2:
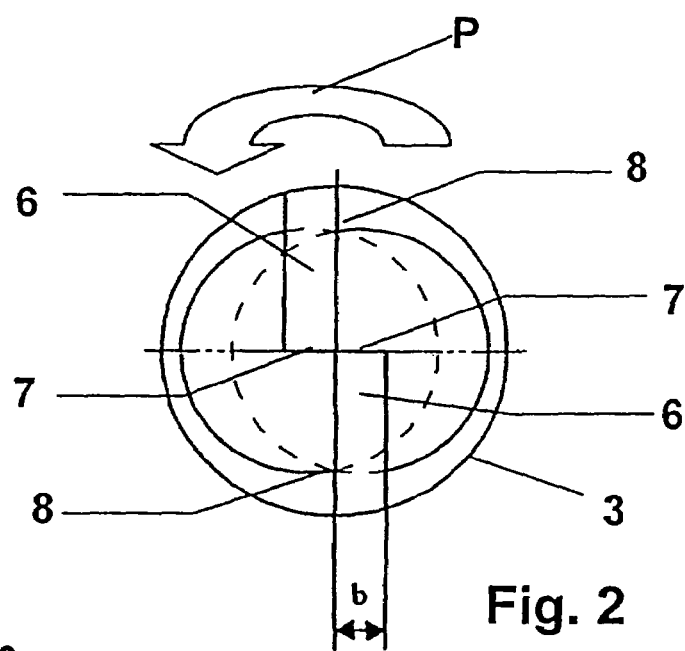
FIG. 2 is a front view of the inventive milling tool of FIG. 1.
Figure 3:
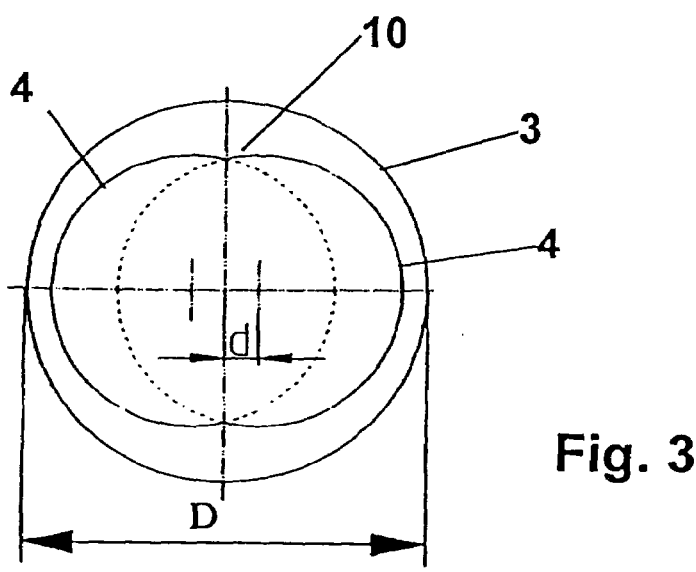
FIG. 3 is the view of FIG. 2, which shows the detailed arrangement of the bores.

In FIGS. 1 to 3, a first embodiment of the milling tool 1 is shown that can be used as a tubular drill in jewellery processing. The milling tool 1 comprises a shaft 2, at the front end of which a working portion 3 is provided. As shown, two bores 4 extend into a face of the working portion 3 from its face side. The bores 4 are disposed axially parallel to each other and with respect to the axis 5 of the tool 1 and offset by a distance "d" laterally with respect to the axis 5 of the tool 1. As shown in FIG. 3, this configuration results a slightly constricted circle, when looking on the contour of the two bores 4 from the face side of the milling tool 1. The distance "d" of the lateral displacement of the bore 4 from the axis 5 of the tool 1 can have any value and ranges preferably between 0 to a maximum of about 0.25 of the diameter "D" of the working portion 3.

The arrangement of the bores 4 is selected such that there results, on the whole, a symmetric assembly of the working portion 3. In FIG. 2, this is discernible particularly well from the fact that the centers 7 of the bores 4 are equally spaced from a symmetric axis of the milling tool 1.

Further, two slits 6 are arranged in the working portion 3, the lower edge of which, positioned at the back in the rotational direction "P", forms a cutting edge 8. The slits 6 are positioned exactly such that respectively one slit 6 follows one of the contractions 10 formed by the contour of the bores 4. As shown in FIG. 2, each respective slit 6 is positioned directly in front of a corresponding contraction 10—relative to the rotational direction "P" of the milling tool 1. Consequently, the following side surface of the slit 6 extends substantially through the axis 5 of the tool 1.

The width of the slits 6 can have any size and preferably ranges from 0 to a maximum of about 0.5 of the diameter "D" of the working portion 3.

Figure 4:
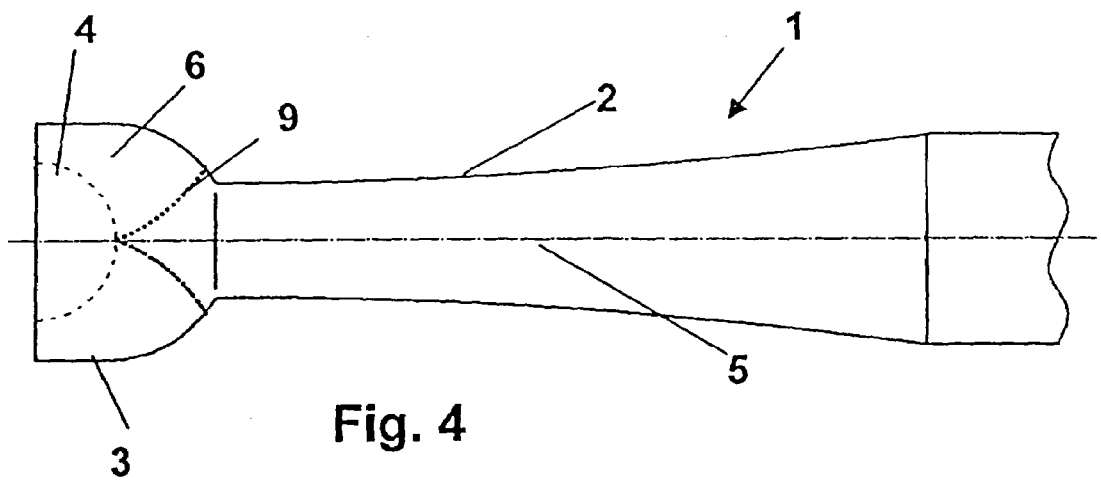
FIG. 4 is a side view of an alternative embodiment of the inventive milling tool.

The groove bottom 9 of the slits 6 is formed smoothly, to guarantee a trouble-free chip removal. It can be shaped flat, as shown in FIG. 1, or arc-shaped, as shown in an alternative embodiment in FIG. 4.

Figures 5, 6, 7:
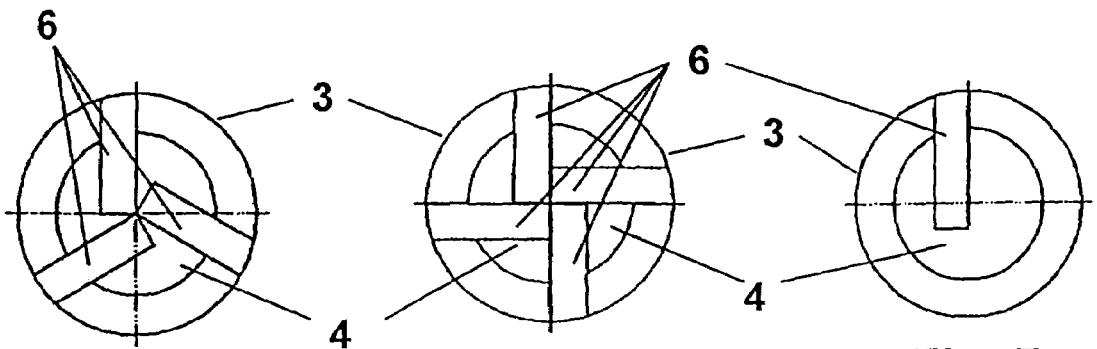
FIGS. 5 to 7 are front views of further embodiments of the inventive milling tool.
Figure 8:
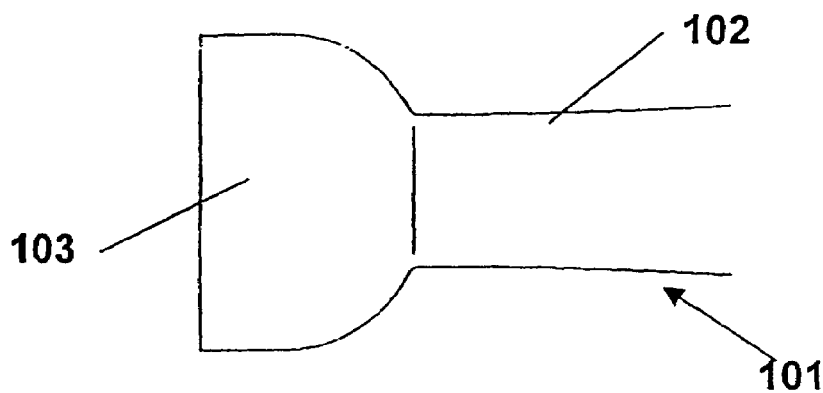
FIG. 8 is a side view of a milling tool according to the state of the art.
Figure 9:
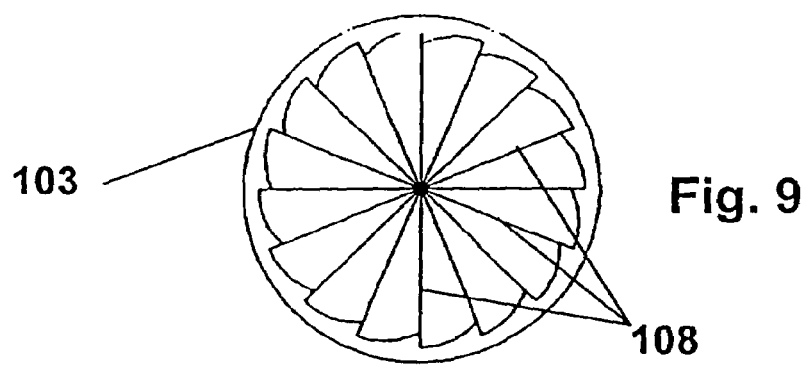
FIG. 9 is a front view of the milling tool of FIG. 8.

The inventive milling tool 1 is preferably provided with two bores 4, two slits 6 and two cutting edges 8. However, it is also possible to provide three or four cutting edges 8, as shown in FIGS. 5 and 6. As shown in FIGS. 5 and 6, the arrangement of the bores 4, the slits 6 and the cutting edges 8 is made such that, on the whole, there results a symmetric assembly of the working portion 3.

As an alternative to the embodiments shown in FIGS. 1 to 6, also one single cutting edge 8 can be provided as shown in FIG. 7. If only one single cutting edge 8 is provided, one could possibly do without the displacement of the bore 4. In any case, however, the number of bores 4 also corresponds to the number of cutting edges 8 or the number of slits 6, respectively.

As an alternative, the bores also can be arranged not axially parallel, i.e. in an angle, preferably between 0° and 20° and further preferred between 0° and 10°, with respect to the axis of the tool, although this is not illustrated in FIGS. 1 to 9. Nevertheless, substantially the same advantageous effects are achieved as described in the embodiments according to FIGS. 1 to 9.

The invention claimed is:

1. A milling tool comprising:
   a shaft (2);
   a working portion (3) including a face and an outer circumferential surface;
   at least one cutting edge (8) formed in an area of the face of the working portion (3);
   at least one bore (4) extending along an axis into the face of the working portion, wherein the bore (4) is arranged eccentrically such that the axis of the bore extends laterally offset with respect to an axis (5) of the tool; and
   at least one slit (6) provided at the face of the working portion, the slit includes a following edge forming a cutting edge (8) of the working portion, wherein the slit extends from the axis (5) of the tool to the outer circumferential surface of the working portion (3), and wherein a following side surface of the slit (6) substantially extends through the axis (5) of the tool.

2. The milling tool as claimed in claim 1, wherein the at least one bore (4) comprises at least two bores (4) that are arranged offset laterally with respect to the axis (5) of the tool in different directions such that the contour of the bores (4) viewed from a face side of the working portion forms a circle being slightly centrically constricted.

3. The milling tool as claimed in claim 1, wherein two slits (6) are provided which are arranged such that each respective slit (6) is disposed directly in front of a corresponding contraction (10) relative to the rotational direction (P).

4. The milling tool as claimed in claim 1, wherein the at least one cutting edge (8) comprises a plurality of cutting edges (8) and wherein the number of eccentric bores (4) corresponds to the number of cutting edges (8) or the number of slits (6), respectively.

5. The milling tool as claimed in claim 1, wherein the bores (4), the slits (6) and the cutting edges (8) are arranged such that a symmetric assembly results.

6. The milling tool as claimed in claim 1, wherein each slit (6) includes a smooth arc-shaped groove bottom (9).

7. The milling tool as claimed in claim 1, wherein each bore (4) has the shape of a semicircle when viewed from a side of the milling tool.

8. The milling tool as claimed in claim 1, wherein each bore (4) has the shape of a cone when viewed from a side of the milling tool.

9. The milling tool as claimed in claim 1, wherein a displacement (d) of each bore (4) ranges from 0 to a maximum of about 0.25 of a diameter (D) of the working portion (3).

10. The milling tool as claimed in claim 1, wherein a width (b) of the slits (6) ranges from 0 to a maximum of about 0.5 of a diameter (D) of the working portion (3).

11. The milling tool as claimed in claim 2, wherein two slits (6) are provided which are arranged such that each respective slit (6) is disposed directly in front of a corresponding contraction (10) relative to the rotational direction (P).

12. The milling tool as claimed in claim 2, wherein the at least one cutting edge (8) comprises a plurality of cutting edges (8) and wherein the number of eccentric bores (4) corresponds to the number of cutting edges (8) or the number of slits (6), respectively.

13. The milling tool as claimed in claim 2, wherein the bores (4), the slits (6) and the cutting edges (8) are arranged such that a symmetric assembly results.

14. The milling tool as claimed in claim 2, wherein each slit (6) includes a smooth arc-shaped groove bottom (9).

15. The milling tool as claimed in claim 2, wherein each bore (4) has the shape of a semicircle when viewed from a side of the milling tool.

16. The milling tool as claimed in claim 2, wherein each bore (4) has the shape of a cone when viewed from a side of the milling tool.

17. The milling tool as claimed in claim 2, wherein a displacement (d) of each bore (4) ranges from 0 to a maximum of about 0.25 of a diameter (D) of the working portion (3).

18. The milling tool as claimed in claim 2, wherein a width (b) of the slits (6) ranges from 0 to a maximum of about 0.5 of a diameter (D) of the working portion (3).

19. The milling tool as claimed in claim 1, wherein the axis of the bore (4) extends axially parallel with respect to the axis (5) of the tool.

20. The milling tool as claimed in claim 1, wherein the axis of the bore (4) extends at an angle of between 0° to 20° with respect to the axis (5) of the tool.

* * * * *